UNITED STATES PATENT OFFICE.

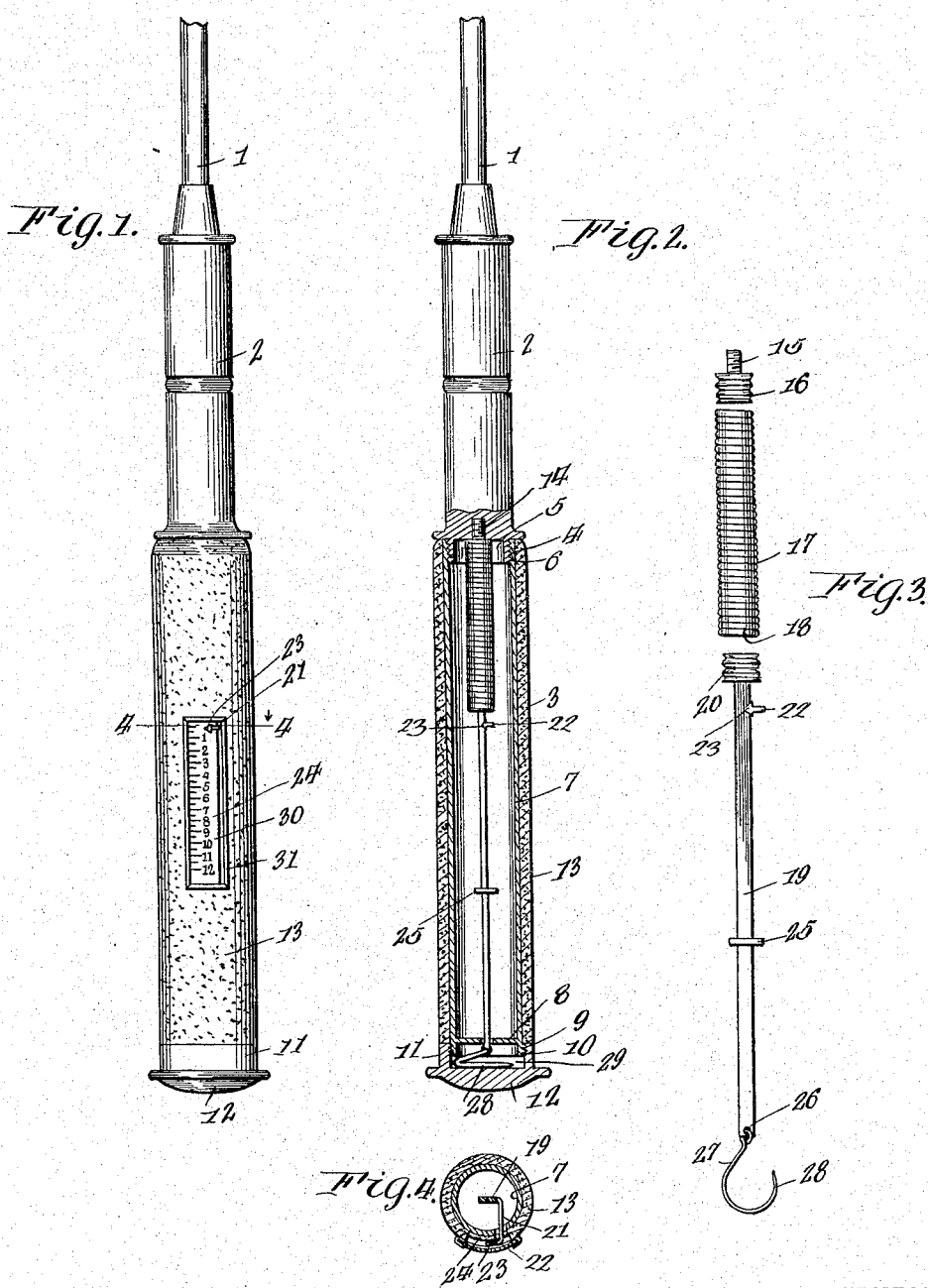

PERCIVAL C. STODDART, OF PLAINFIELD, NEW JERSEY.

COMBINED FISHING-ROD HANDLE AND WEIGHING-SCALE.

1,174,526.  Specification of Letters Patent.  Patented Mar. 7, 1916.

Application filed April 5, 1913. Serial No. 759,151.

*To all whom it may concern:*

Be it known that I, PERCIVAL C. STODDART, a citizen of the United States, residing at Plainfield, in the county of Union and State of New Jersey, have invented certain new and useful Improvements in Combined Fishing-Rod Handles and Weighing-Scales, of which the following is a specification.

This invention relates to fishing apparatus and more particularly to a handle for a fishing-rod which has a weighing scale mounted therein.

The primary object of this invention is to provide convenient and efficient means whereby the fisherman may weigh his catch immediately after landing the fish or at any other time that he chooses; and a device which being mounted within the handle of the fishing-rod may be easily and conveniently carried about, adding very little weight to the fishing equipment and occupying no more space than would an ordinary rod.

Another object of this invention is to mount the graduated plate and the indicator which designates the various weights of the fish, in such a manner that the indicator will at all times be prevented from engagement with foreign articles, such as the fishing line or many other articles which would render the device inoperative and also to cover the indicator and graduated plate with a transparent protector in order to keep dust or gravel from entering the interior of the handle.

A further object of this invention is to provide a device of this nature which is compact, neat and simple in construction, attractive in appearance, and efficient in operation.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters of reference designate like or corresponding parts throughout the several views, and in which, Figure 1 is an elevational view of the handle of the fishing-rod showing the indicator and the graduated plate thereupon; Fig. 2 is a longitudinal sectional view through the handle, exposing the interior mechanism of the weighing apparatus; Fig. 3 is a view of the weighing apparatus or scale removed; and, Fig. 4 is a cross-sectional view taken on the line 4—4 of Fig. 1.

In the drawings, the numeral 1 designates the fishing-rod which may be of any of the various types which are now in use and which has the reel seat 2 mounted upon the large end thereof or the end to which the handle portion of the rod is connected. The reel seat 2 is connected to the handle 3 by means of external screw-threads 4 upon a depending lug 5 thereupon and the internal screw-threads 6 upon the upper end of the handle 3. The handle 3 is composed of a metallic member 7 which is substantially cylindrical in shape and has its lower end closed by means of a closure 8. The portion of the metallic member 7 which extends below the closure 8 is provided with external screw-threads 10 upon the shank 11 of the cap 12. Surrounding the metallic member 3 is a cork pad 13 which adds to the attractiveness of the handle as well as forming a more comfortable and efficient means for gripping the handle.

The reel seat 2 has an internally screw-threaded aperture 14 centrally located in its lower portion as is clearly shown in Fig. 2 of the drawings and the screw-threaded shank 15 of the member 16 is mounted therein. The main body portion of the member 16 is provided with a plurality of annular corrugations which receive the upper end of the spring 17 which forms a portion of the weighing scale. The lower end 18 of the spring 17 is connected to the rod 19 by means of a member 20 which is also provided with a plurality of annularly arranged corrugations which are disposed in relation to each other similarly to the relation of screw-threads so as to more efficiently engage the coils of the spring 17. The corrugations upon the member 16 are also arranged similarly to the arrangement of screw-threads.

The rod 19 has an indicator 21 which has its outer end 22 bent at right angles and is provided with an arrow head 23. The first bent portion of the indicator 21 passes along one side of a graduated plate 24 and the arrow head 23 of the indicator 21 is arranged parallel with the surface of the recording plate 24 which has the various graduations, which graduations designate the number or fractional number of pounds of the article which is being weighed thereupon. The rod 19 is held in place by means of a bracket 25 which is mounted on the interior of the cylindrical member 7 of the handle. The lower end of the rod 19 has an aperture 26 extending therethrough in which is loosely or hingedly mounted a hook 27. The hook 27 has its free or outer end 28 sharpened so as to efficiently and securely engage the mouth of a fish and hold the same thereupon during the weighing operation. When the weighing apparatus of the device is out of operation, the hook 27 is folded inwardly and seated in the recess 29 which is formed on the interior of the cap 12, as is clearly illustrated in Fig. 2 of the drawings.

When the fisherman desires to weigh the fish which he has just caught, or at any other time he chooses, the cap 12 is unscrewed from the cylindrical member 7 which allows the hook 28 to fall outwardly and assume a position which is parallel or in alinement with the rod 19 of the weighing apparatus. The fish is then securely placed upon the hook 28 and the weight of the same will cause the spring 17 to expand a relative distance as is well known in the art of spring scales. This will cause the arrow head 23 upon the indicator 21 to assume the position opposite the member upon the graduated plate 24 which registers the weight of the fish.

The graduated plate 24 is mounted in a recess within the cork 13 of the handle 3 and the indicator is protected from engagement with foreign articles such as the fishing line, small branches, or any other foreign article which might tend to render the device inoperative by means of a transparent covering 30 which is mounted in a casing 31. The casing 31 is secured to the cork portion 13 of the handle 3 in any suitable manner.

In practical fields, certain minor features of construction, combination and arrangement of parts may necessitate alterations to which the patentee is entitled, provided such alterations are comprehended within the scope of what is claimed.

What is claimed is:—

In combination with a fishing rod having one end exteriorly threaded, a sleeve interiorly threaded at one end adapted to be received on the threaded end of the rod and provided with an elongated opening, said sleeve having a perforated closure formed therein a short distance from the opposite end, a threaded projection secured to the end of the rod within the sleeve, a coil spring having one end secured to said threaded projection, a rod secured to the opposite end of the spring and adapted to pass through the perforation in the closure within the sleeve, a hook secured to the free end of said rod, an indicator arm formed on the rod and extending through the elongated opening of the sleeve, and a recessed cap adapted to be received on the end of the sleeve, the hook being adapted to be received in the end of the sleeve and the recess of the cap.

In testimony whereof I affix my signature in presence of two witnesses.

PERCIVAL C. STODDART.

Witnesses:
JOHN BOLAND,
THOMAS F. STODDART.

Copies of this patent may be obtained for five cents each, by addressing the "Commissioner of Patents Washington, D. C."